United States Patent
Buttimer et al.

(10) Patent No.: US 12,114,031 B2
(45) Date of Patent: Oct. 8, 2024

(54) STREAMING MEDIA ASSOCIATED WITH A PREMISES SECURITY SYSTEM

(71) Applicant: The ADT Security Corporation, Boca Raton, FL (US)

(72) Inventors: Maurice Buttimer, Newtown Square, PA (US); James Beck, Landenburg, PA (US)

(73) Assignee: The ADT Security Corporation, Boca Raton, FL (US)

( * ) Notice: Subject to any disclaimer, the term of this patent is extended or adjusted under 35 U.S.C. 154(b) by 11 days.

(21) Appl. No.: 18/091,147

(22) Filed: Dec. 29, 2022

(65) Prior Publication Data

US 2024/0223830 A1 Jul. 4, 2024

(51) Int. Cl.
*H04N 21/266* (2011.01)
*H04N 21/234* (2011.01)
*H04N 21/472* (2011.01)

(52) U.S. Cl.
CPC ......... *H04N 21/266* (2013.01); *H04N 21/234* (2013.01); *H04N 21/472* (2013.01)

(58) Field of Classification Search
CPC ... H04N 21/266; H04N 21/234; H04N 21/472
See application file for complete search history.

(56) References Cited

U.S. PATENT DOCUMENTS

| | | | | |
|---|---|---|---|---|
| 11,523,485 B1 * | 12/2022 | Fu | ........................... | H04N 7/181 |
| 2006/0173997 A1 * | 8/2006 | Tullberg | ............... | H04L 67/025 |
| | | | | 709/224 |
| 2015/0256992 A1 * | 9/2015 | Kelleman | ............. | H04W 48/12 |
| | | | | 370/254 |
| 2022/0078229 A1 * | 3/2022 | Kitchen | ................ | H04L 67/025 |
| 2023/0308901 A1 * | 9/2023 | De Andrade | ......... | H04W 24/08 |

* cited by examiner

*Primary Examiner* — Adil Ocak
(74) *Attorney, Agent, or Firm* — Weisberg I.P. Law, P.A.

(57) ABSTRACT

A user interface device associated with a premises security system that is configured to monitor a premises using a plurality of premises devices is provided. The user interface device includes processing circuitry configured to receive a request to stream video from a premises device of the plurality of premises devices, select one of a plurality of media servers to use to stream the video from the premises device, initiate a streaming channel to the selected media server to initiate the video streaming process with the selected media server, and receive, from the selected media server, the video stream associated with the premises device for playback.

20 Claims, 5 Drawing Sheets

STREAMING MEDIA ASSOCIATED WITH A PREMISES SECURITY SYSTEM

TECHNICAL FIELD

The present disclosure is generally related to streaming media associated with a premises security system.

BACKGROUND

Network cloud servers ("servers") provide various network resources and services that support a variety of functions, such as video and audio streaming. Load balancing is one manner in which workload is divided in the servers. For example, when an incoming request is received from a client device, a load balancer may forward the request to one of a number of servers that can handle the request.

Servers may be streaming media servers that receive video and audio streams from one or more cameras and forward the video streams to a number of mobile and Web clients. Some load balancers for streaming media servers operate by selecting a steaming media server randomly from a number of the available streaming media servers to service a request.

BRIEF DESCRIPTION OF THE DRAWINGS

A more complete understanding of the present disclosure, and the attendant advantages and features thereof, may be more readily understood by reference to the following detailed description when considered in conjunction with the accompanying drawings wherein.

DETAILED DESCRIPTION

Figure 1:
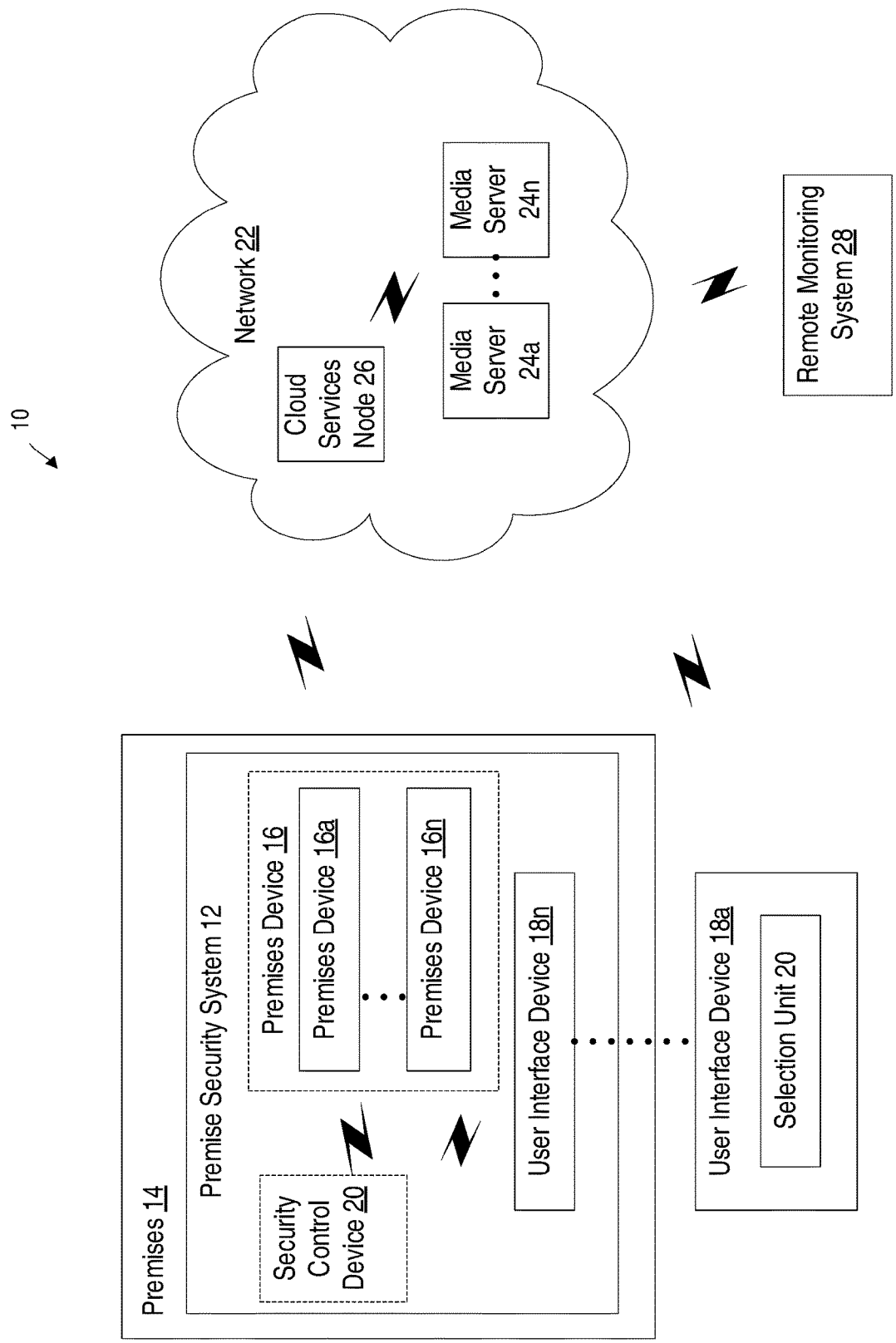
FIG. 1 is a diagram of an example system according to various embodiments of the present disclosure.

The present disclosure relates to configuring a playback device to open a streaming channel to a specific one of a plurality of media servers early in the media streaming process, thereby reducing delay (e.g., overall streaming start-up delay). Further, the selection of the media server by the playback device provides load balancing in the cloud network server.

Before describing in detail exemplary embodiments, it is noted that the embodiments may reside in combinations of apparatus components and processing steps related to streaming media associated with a premises security system where the streaming is performed in a load-balanced manner with reduced startup delay compared to existing systems. Components may be represented by conventional symbols in the drawings, focusing on those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures in which like reference designators refer to like elements there is shown in FIG. 1 a system designated generally as "10." System 10 may include premises security system 12 that is configured to monitor premises 14. Premises security system 12 includes and/or is associated with one or more premises devices 16a-16n (collectively referred to as "premises device 16"), one or more user interface devices 18 and security control device 19. The user interface devices 18, premises device 16 and security control device 19 may communicate via one or more wired or wireless communication channels.

Premises devices 16a-16n may include sensors, control devices, images capture devices, life safety devices, lifestyle devices and/or other devices. For example, the types of sensors may include various life safety related sensors such as motion sensors, fire sensors, carbon monoxide sensors, flooding sensors and contact sensors, among other sensor types. The control devices may include, for example, one or more lifestyle related devices configured to adjust at least one premises setting such as lighting, temperature, energy usage, door lock and power settings, among other settings associated with the premises or devices on the premises. Image capture devices may include digital cameras and/or video cameras, among other image or video capture devices. In one or more embodiments, the image capture device is configured to stream captured media (e.g., audio and video) as described herein.

User interface device 18 may be a wireless device (e.g., wireless mobile device) that is configured to stream media associated with premises device 16. User interface device 18 may be a security control panel (e.g., keypad/interface), computer, laptop, wireless mobile phone, among other devices that are configured to initiate media streaming from premises device 16 for playback on, for example, user interface device 18. In one or more embodiments, user interface device 18 (e.g., security control panel) may be part of premises security system 12 or may be associated with premises security system 12 such as via a client software application stored on the user interface device 18. User interface device 18 may communicate with one or more elements in premises security system 12 using one or more wired and/or wireless communication protocols.

In one or more embodiments, user interface device 18 includes selection unit 20 that is configured to perform one or more user interface device 18 functions such as functions related to streaming media associated with a premises security system 12, as described herein.

In one or more embodiments, premises security system 12 may not include a security control device 20 such that system 12 may be only used to monitor a location by video camera. That is, in some examples, the premises security system 12 may be a system 12 that is not related to premises security monitoring by a remote monitoring system 28 and may be directed to non-security environments such as, for example, a TV studio or any live video venue. System 12 may be a video communication system 12 such as a system that is associated with a media streaming server and one or more cameras.

System 10 may further include one or more networks 22 (collectively referred to as "network 22"). Network 22 may be a wide area network, local area network, wireless local network and metropolitan area network, among other networks. Network 22 provides communications among one or more of entities in system 10, as described herein.

Network 22 includes one or more media servers 24*a*-24*n* (collectively referred to as media server 24) that are configured to receive media from, for example, premises device 16 and to transmit or stream the media to a user interface device 18 for playback. Media server 24 may be in communication with one or more entities in system 10, such as with premises device 16, user interface device 18, cloud services node 26, etc. Cloud services node 26 may correspond to one or more nodes or servers in network 22 and is configured to service media requests as described herein. Cloud services node 26 may be in communication with one or more entities in system 10 such as with, for example, premises device 16, media server 24, etc. In one or more embodiments, premises device 16 (e.g., video camera) may be connected to cloud services node 26 via a camera control server (not shown).

System 10 may further include one or more remote monitoring system 28 (collectively referred to as "remote monitoring system 28"), communicating with at least one other entity in system 10 such as with premises security system 12 via network 22 for responding to security alarms that are communicated from security control device 19.

Figure 2:
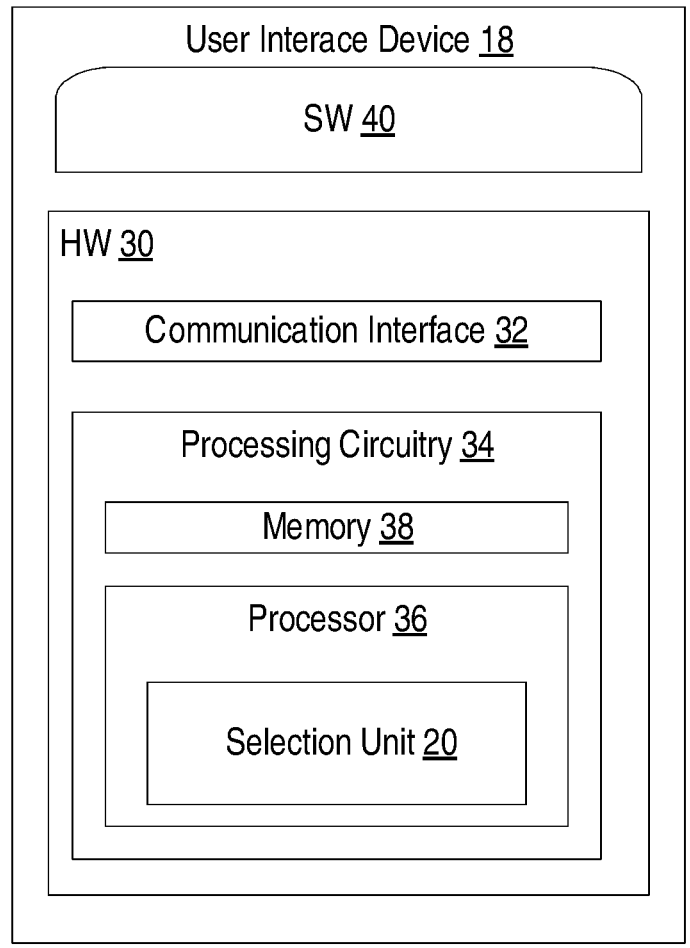
FIG. 2 is a diagram of an example user interface device of FIG. 1 according to some embodiments of the present disclosure.

With respect to FIG. 2, the example system 10 includes a user interface device 18 that includes hardware 30 enabling the user interface device 18 to communicate with one or more entities in system 10 and to perform one or more functions described herein.

The hardware 30 may include a communication interface 32 for setting up and maintaining at least a wired and/or wireless connection to one or more entities in system 10 such as with remote monitoring system 28, a premises device 16, media server 24, cloud services node 26, among other entities in system 10, etc.

In the embodiment shown, the hardware 30 of the user interface device 18 further includes processing circuitry 34. The processing circuitry 34 may include a processor 36 and a memory 38. In particular, in addition to or instead of a processor, such as a central processing unit, and memory, the processing circuitry 34 may comprise integrated circuitry for processing and/or control, e.g., one or more processors, processor cores, field programmable gate arrays (FPGAs), and/or application specific integrated circuits (ASICs) adapted to execute instructions. The processor 36 may be configured to access (e.g., write to and/or read from) the memory 38, which may comprise any kind of volatile and/or nonvolatile memory, e.g., cache, buffer memory, random access memory (RAM), read-only memory (ROM), optical memory, and/or erasable programmable read-only memory (EPROM).

The user interface device 18 further has software 40 stored internally in, for example, memory 38, or stored in external memory (e.g., database, storage array, network storage device, etc.) accessible by the user interface device 18 via an external connection. Software 40 may include a client application for authenticating the user interface device 18 with, for example, cloud services and premise security system 12 for accessing cloud services and premises security system 12. The software 40 may be executable by the processing circuitry 34. The processing circuitry 34 may be configured to control any of the methods and/or processes described herein and/or to cause such methods, and/or processes to be performed, e.g., by user interface device 18. Processor 36 corresponds to one or more processors 36 for performing user interface device 18 functions described herein. The memory 38 is configured to store data, programmatic software code and/or other information described herein. In some embodiments, the software 40 may include instructions that, when executed by the processor 36 and/or processing circuitry 34, cause the processor 36 and/or processing circuitry 34 to perform the processes described herein with respect to user interface device 18. For example, processing circuitry 34 of the user interface device 18 may include selection unit 20, which is configured to perform one or more functions described herein such as with respect to, for example, media server selection and media streaming initiation, as described herein.

Although FIGS. 1 and 2 show selection unit 20 as being within a respective processor, this unit may be implemented such that a portion of the unit is stored in a corresponding memory within the processing circuitry. In other words, the unit may be implemented in hardware or in a combination of hardware and software within the processing circuitry.

Figure 3:
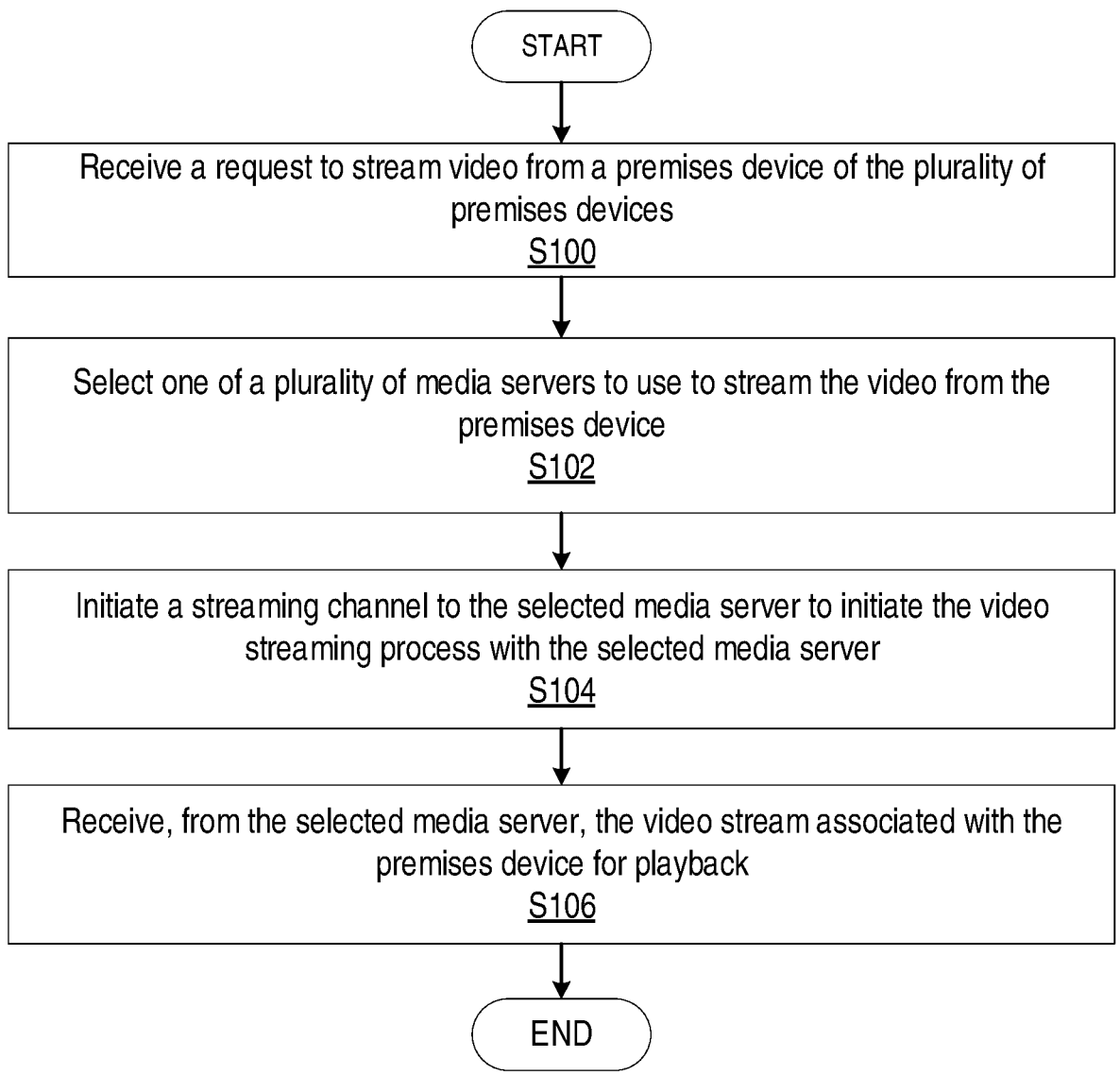
FIG. 3 is a flowchart of an example process according to some embodiments of the present disclosure.

FIG. 3 is a flowchart of an example process implemented by a user interface device 18 according to one or more embodiments of the present disclosure. One or more blocks described herein may be performed by one or more elements of user interface device 18, such as by one or more of hardware 30, communication interface 32, processing circuitry 34 (including selection unit 20), processor 36, memory 38, etc. User interface device 18 is configured to receive (Block S100) a request to stream video from a premises device 16 of the plurality of premises devices 16, as described herein. User interface device 18 is configured to select (Block S102) one of a plurality of media servers 24 to use to stream the video from the premises device 16, as described herein. User interface device 18 is configured to initiate (Block S104) a streaming channel to the selected media server 24 to initiate the video streaming process with the selected media server 24, as described herein. User interface device 18 is configured to receive (Block S106), from the selected media server 24 where the video stream is associated with the premises device 16 for playback, as described herein.

According to one or more embodiments, the processing circuitry 34 is further configured to: determine a unique identifier associated with the premises device 16, generate a numerical value based on a hash function of the unique identifier, and select the selected media server 24 to use for the streaming of video based on the numerical value.

According to one or more embodiments, the numerical value is within a range of zero to a quantity of the plurality of media servers 24 minus 1.

According to one or more embodiments, the unique identifier is a medium access control (MAC) address of the premises device 16.

According to one or more embodiments, the processing circuitry 34 is further configured to receive an indication of the plurality of media servers 24 that are available to provide video streaming, determine a respective unique identifier for each of the plurality of premises devices 16, generate a respective numerical value for each of the plurality of premises devices 16 based on a hash function of the respective unique identifier, each numerical value corresponding to a respective one of the plurality of media servers 24, store a plurality of associations between the respective premises devices 16 and media servers 247 based on the respective numerical values, and select the selected media server 24 to use for the streaming of video from the premises device 16 based on one of the plurality of associations.

According to one or more embodiments, the plurality of associations are configured to provide load balancing for the plurality of media servers 24 for streaming requests associated with the plurality of premises devices 16.

According to one or more embodiments, the request to stream video is received from a user of the user interface device 18.

According to one or more embodiments, the premises device 16 is a camera.

According to one or more embodiments, the user interface device 18 is one of a mobile wireless device or a security control panel of the premises security system 12.

According to one or more embodiments, the initiating of the streaming channel to the selected media server 24 is configured to cause the selected media server 24 to send a start streaming command to a cloud services node to initiate the video stream from premises device 16.

Figure 4:
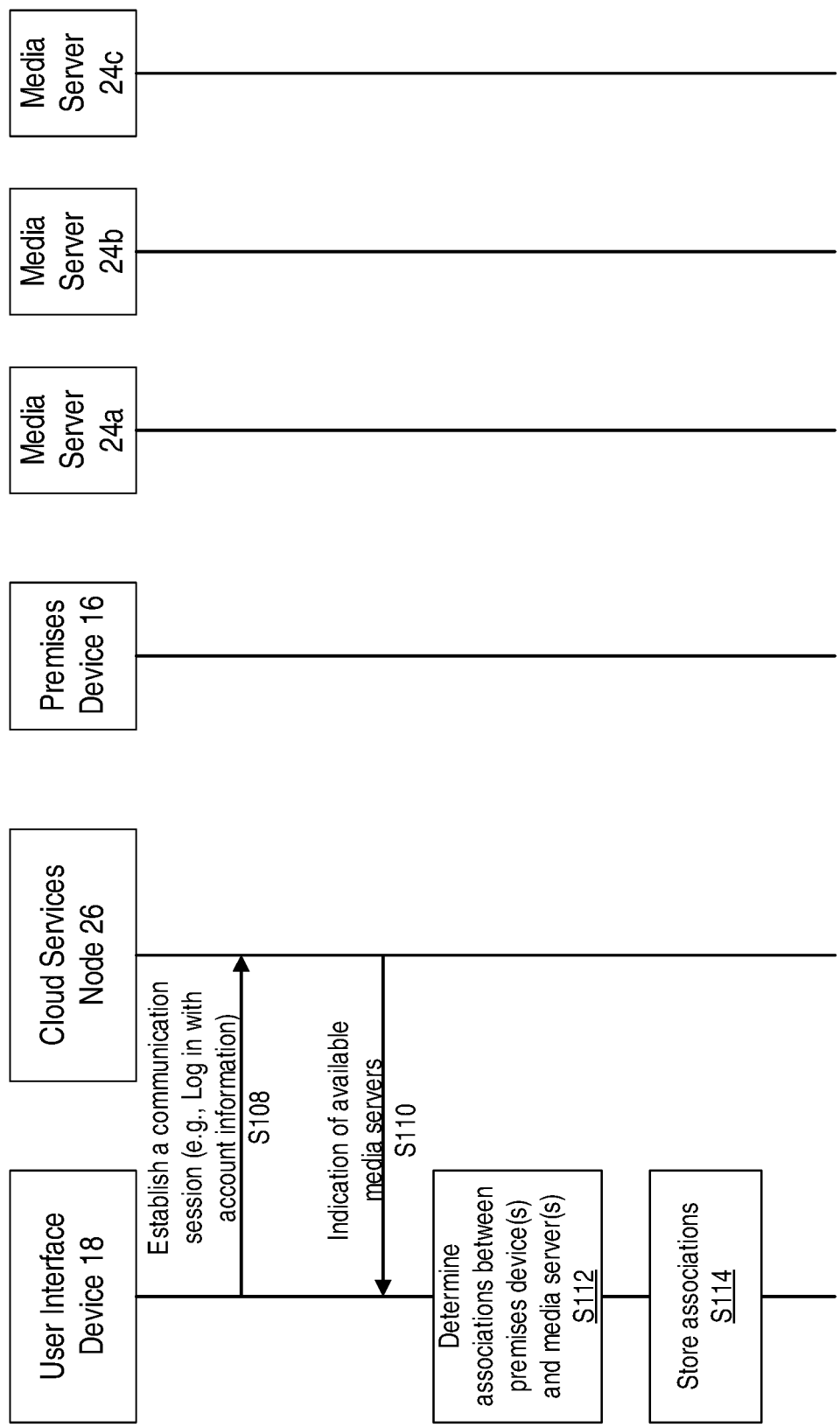
FIG. 4 is a signaling diagram of an example process according to some embodiments of the present disclosure.

FIG. 4 is a signaling diagram of an example process according to some embodiments of the present disclosure. In one or more embodiments, the process of FIG. 4 may be a pre-configuration process that facilitates the user interface device 18 generating associations between media servers 24 and one or more premises devices 16 of premises security system 12, such as, for example, before a request for to stream media is received, thereby facilitating the user interface device 18 initiating the streaming process with reduced delay when the request is received.

User interface device 18 is configured to establish a communication session, i.e., log in to begin a media streaming session, (S108) to cloud services node 26 with account information. For example, user interface device 18 may transmit account credentials to cloud services node 26 to authenticate the user interface device 18 and indicate that the user interface device 18 is authorized to obtain streaming video. Cloud services node 26 may respond (S110) to user interface device 18 with an indication of available media servers 24 if the account information is authenticated. In one or more embodiments, the cloud services node 26 responds to user interface device 18 by communicating a list of network addresses of a plurality of available media servers 24 that are available to stream media.

In one or more embodiments, steps S108 and S110 may occur with every streaming request. However, in one or more embodiments, user interface device 18 and/or cloud services node 26 may perform these steps less often such as to enhance efficiency. In one example, user interface device 18 logs in once and can then participate in multiple streaming requests to multiple cameras before logging out or user interface device 18 goes to sleep (e.g., enters a low-power mode) or is turned off by the user. Therefore, in one example, step S108 may be performed once per several streaming requests.

Another example of when one or more of Steps S108 and S110 may be performed is when cloud services node 26 determines the composition of available streaming servers changes such that an updated list of available media servers is transmitted to user interface device 18. However, in one example, the composition of the available streaming servers may change very rarely such as when a new cloud services deployment occurs.

User interface device 18 is configured to determine (S112) associations between one or more premises devices 16 and media servers 24. In one or more embodiments, the associations relate to assigning or designating a respective premises device 16 to a respective media server 24, which in turn provides load balancing at the media servers 24 with respect to streaming requests associated with the assigned premises devices 16. In one example, the premises devices 16 that are associated with media servers 24 are video cameras, while other premises devices 16 (e.g., door sensors, fire sensors, etc.) are not associated with media servers 24.

In one or more embodiments, the associations between the premises devices 16 and the media servers 24 are determined based on a hash function of a unique identifier for each premises device 16 that is being considered for association with a media server 24. For example, premises device 16a and 16b are respective video cameras 16a and 16b where video camera 18a has a first MAC address and video camera 18b has a second MAC address. User interface device 18 performs a hash function of the first MAC address to generate a first numerical value and a hash function of the second MAC addresses to generate a second numerical value. In one or more embodiments, each MAC address is converted to a numerical value by converting the hexadecimal MAC address to decimal.

In particular, the hash function is configured to generate a number in a predefined range such as, for example, a range from 0 to a number of available media servers 24 minus one, where the available media servers may be indicated in S110. For example, a hash function of the first MAC address of video camera 18a results in a numerical value of 1 while the hash function of the second MAC address of video camera 16b results in a numerical value of 2. In one or more embodiments, the has function is a reminder operator function.

Further, the media servers 24a-24c may be designated (e.g., by user interface device 18) with a respective numerical or identifier value within the range such that, for example, media server 24a is designated with a numerical value of 0, media server 24b is designated with a numerical value 1 and media server 24c is designated with a numerical value of 2. The associations may then be formed by matching the numerical values of the video cameras 16a, 18b with media servers 24b, 24c, in this example.

User interface device 18 is configured to store (S114) the associations generated in S112 for later use such as, for example, when a request to stream media is received from a user.

Figure 5:
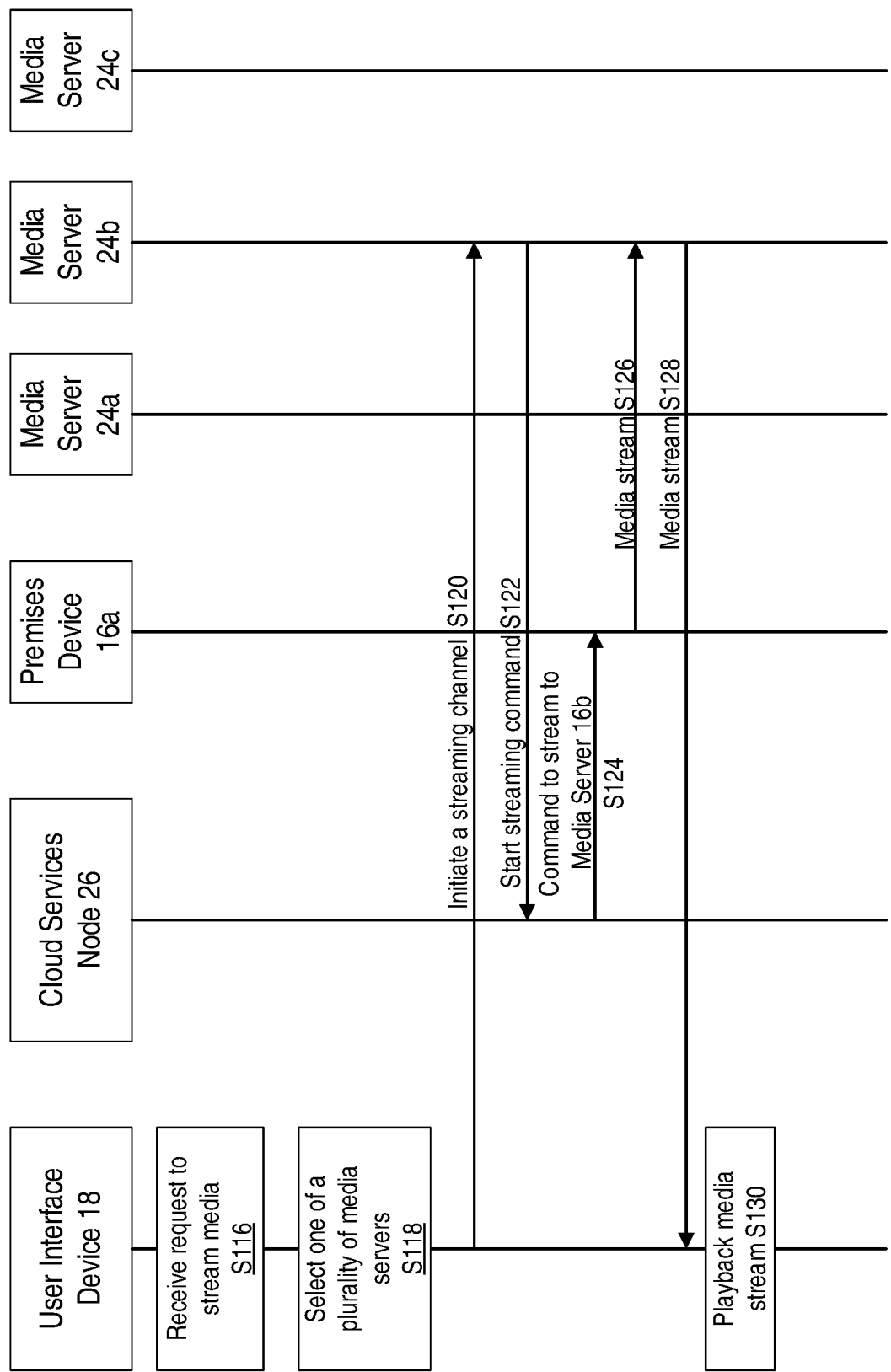
FIG. 5 is a signaling diagram of another example process according to some embodiments of the present disclosure.

FIG. 5 is a signaling diagram of another example process according to some embodiments of the present disclosure. User interface device 18 is configured to receive (S116) a request to stream media (e.g., video) from premises device 16a. For example, a user of user interface device 18 may input a request to stream media via display and client software application of user interface device 18. User interface device 18 is configured to select (S118) one of a plurality of media servers 24 for streaming the requested media. In this example, media server 24b is selected based on the stored association between the premises device 16a and media server 24b as described above with respect to FIG. 4.

User interface device 18 is configured to initiate a streaming channel with the selected media server 24b, in this example. Media server 24b responds by transmitting a start streaming command (S122) to cloud services node 26. In response to the start streaming command, cloud services node 26 transmits (S124) a comment to premises device 16a for premises device 16a to stream media to media server 24b. In response, premises device 16a streams media (e.g., video) to media server 24b. Media server 24b then transmits or forwards media stream (e.g., video stream) to user interface device 18. User interface device 18 receives the media stream from media server 24b and then initiates playback of the media stream.

Therefore, in one or more embodiments, user interface device 18 is configured to initiate the streaming process by opening a streaming channel to a selected media server 24. When the initial video packets of the video stream arrive at media server 24, the media server 24 immediately or almost immediately starts forwarding the video packets to user interface device 18, thereby reducing the startup delay compared to other streaming processes. For example, some other streaming processes have a built-in startup delay since user interface device 18 is required to wait for a premises device 16 (e.g., video camera) connection to be established with the media server 24 before user interface device 18 opens a streaming channel to the media server.

Further, while some other streaming processes are associated with load balancing between media servers 24 to occur by random selection of the media server 24 to service a request, the present disclosure, in some embodiments, perform load balancing between the media servers 24 by associating a respective premises device 16 to a respective media server 24 such as to distribute the video streaming load of various cameras among various media servers 24.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams may include arrows on communication paths to show a primary direction of communication, communication may occur in the opposite direction of the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination.

The present disclosure is not limited to what has been specifically shown and described herein above. In addition, unless mention was made above to the contrary, the accompanying drawings are not to scale. A variety of modifications and variations are possible in light of the above teachings without departing from the scope and spirit of the invention.

What is claimed is:

1. A user interface device associated with a premises security system that is configured to monitor a premises using a plurality of premises devices, the user interface device comprising:
   processing circuitry configured to:
      receive a request to stream video from a premises device of the plurality of premises devices;
      determine a unique identifier corresponding to the premises device;
      generate a numerical value based on the unique identifier;
      select one of a plurality of media servers to use to stream the video from the premises device based on the numerical value;
      initiate a streaming channel to the selected media server to initiate the video streaming process with the selected media server; and
      receive, from the selected media server, the video stream associated with the premises device for playback.

2. The user interface device of claim 1, wherein the numerical value is generated by performing a hash function on the unique identifier.

3. The user interface device of claim 2, wherein the numerical value is within a range of zero to a quantity of the plurality of media servers minus 1.

4. The user interface device of claim 2, wherein the unique identifier is a medium access control (MAC) address of the premises device.

5. The user interface device of claim 1, wherein the processing circuitry is further configured to:
   receive an indication of the plurality of media servers that are available to provide video streaming;
   determine a respective unique identifier for each of the plurality of premises devices;
   generate a respective numerical value for each of the plurality of premises devices based on a hash function of the respective unique identifier, each numerical value corresponding to a respective one of the plurality of media servers;
   store a plurality of associations between the respective premises devices and media servers based on the respective numerical values; and
   select the selected media server to use for the streaming of video from the premises device based on one of the plurality of associations.

6. The user interface device of claim 5, wherein the plurality of associations are configured to provide load balancing for the plurality of media servers for streaming requests associated with the plurality of premises devices.

7. The user interface device of claim 1, wherein the request to stream video is received from a user of the user interface device.

8. The user interface device of claim 1, wherein the premises device is a camera.

9. The user interface device of claim 1, wherein the user interface device is one of a mobile wireless device or a security control panel of the premises security system.

10. The user interface device of claim 1, wherein the initiating of the streaming channel to the selected media server is configured to cause the selected media server to send a start streaming command to a cloud services node to initiate the video stream from premises device.

11. A method implemented by a user interface device associated with a premises security system that is configured to monitor a premises using a plurality of premises devices, the method comprising:
   receiving a request to stream video from a premises device of the plurality of premises devices;
   determining a unique identifier corresponding to the premises device;
   generating a numerical value based on the unique identifier;
   selecting one of a plurality of media servers to use to stream the video from the premises device based on the numerical value;
   initiating a streaming channel to the selected media server to initiate the video streaming process with the selected media server; and
   receiving, from the selected media server, the video stream associated with the premises device for playback.

12. The method of claim 11,
   wherein the numerical value is generated by performing a hash function on the unique identifier.

13. The method of claim 12, wherein the numerical value is within a range of zero to a quantity of the plurality of media servers minus 1.

14. The method of claim 12, wherein the unique identifier is a medium access control (MAC) address of the premises device.

15. The method of claim 11, further comprising:
   receiving an indication of the plurality of media servers that are available to provide video streaming;
   determining a respective unique identifier for each of the plurality of premises devices;
   generating a respective numerical value for each of the plurality of premises devices based on a hash function of the respective unique identifier, each numerical value corresponding to a respective one of the plurality of media servers;
   storing a plurality of associations between the respective premises devices and media servers based on the respective numerical values; and
   selecting the selected media server to use for the streaming of video from the premises device based on one of the plurality of associations.

16. The method of claim 15, wherein the plurality of associations are configured to provide load balancing for the plurality of media servers for streaming requests associated with the plurality of premises devices.

17. The method of claim 11, wherein the request to stream video is received from a user of the user interface device.

18. The method of claim 11, wherein the premises device is a camera.

19. The method of claim 11, wherein the user interface device is one of a mobile wireless device or a security control panel of the premises security system.

20. The method of claim 11, wherein the initiating of the streaming channel to the selected media server is configured to cause the selected media server to send a start streaming command to a cloud services node to initiate the video stream from premises device.

\* \* \* \* \*